Jan. 8, 1924.

C. P. BOWIE ET AL 1,480,045

APPARATUS FOR TREATING HYDROCARBON CONTAINING MATERIALS

Filed June 1, 1922

INVENTORS
Clifford P. Bowie,
Martin J. Gavin,
BY
Booth & Booth
ATTORNEYS.

Patented Jan. 8, 1924.

1,480,045

UNITED STATES PATENT OFFICE.

CLIFFORD P. BOWIE, OF BERKELEY, CALIFORNIA, AND MARTIN J. GAVIN, OF BOULDER, COLORADO.

APPARATUS FOR TREATING HYDROCARBON-CONTAINING MATERIALS.

Application filed June 1, 1922. Serial No. 565,179.

*To all whom it may concern:*

Be it known that we, CLIFFORD P. BOWIE and MARTIN J. GAVIN, citizens of the United States, residing, the said BOWIE at Berkeley, in the county of Alameda and State of California, and the said GAVIN at Boulder, county of Boulder, State of Colorado, have invented certain new and useful Improvements in Apparatus for Treating Hydrocarbon-Containing Materials, of which the following is a specification.

Our invention relates to apparatus for treating hydrocarbon containing materials, especially those of a viscous nature, whether pure or impure, whereby they may be destructively distilled to produce liquids of fluidity sufficient to render them amenable to the usual methods of transporting or refining petroleum products.

Our invention has for its object the provision of a simple and effective apparatus for this purpose; and to this end our invention consists in the novel apparatus, which we shall hereinafter fully describe, reference being made to the accompanying drawings, in which—

Figure 1:
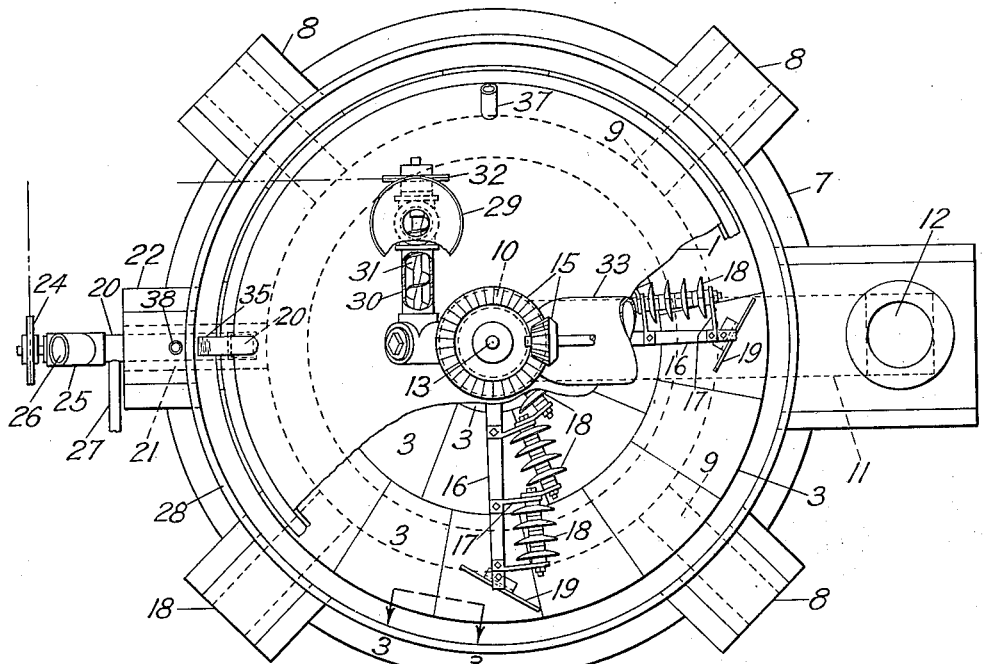
Fig. 1 is a plan of our apparatus, partly in section.

1 is a shell or retort, preferably conical and fitted with base members 2, 2', which rest upon a hearth. The hearth is a sectional one composed of a plurality of plates 3 arranged in concentric rows, the central section being circular and the others wedge shaped, as shown in Fig. 1.

Figure 3:
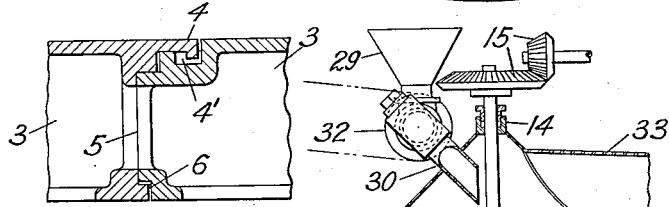
Fig. 3 is a detail, enlarged, on the line 3—3 of Fig. 1.

The sections fit together by overlapping tongue and groove joints as seen at 4, in Fig. 3, the interfitting being with a clearance indicated at 4', to enable the material being treated to fill and close the joints.

Figure 2:
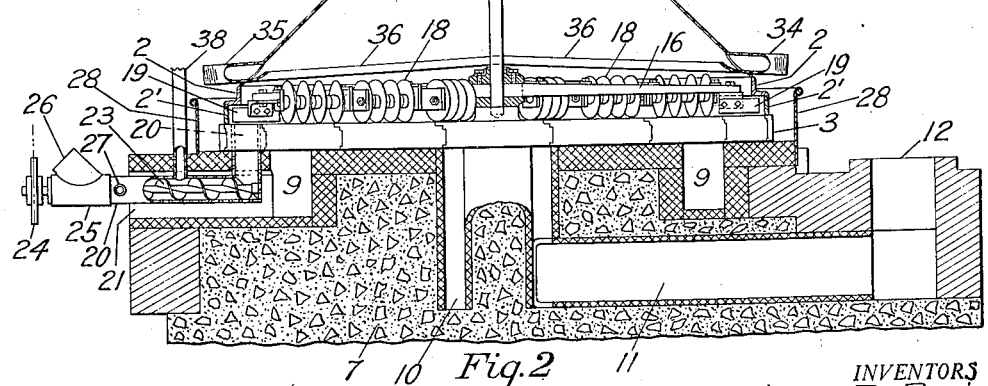
Fig. 2 is a sectional elevation of the same.

The sections are formed with legs 5 having jointed feet 6, and these feet resting upon the top of the masonry foundation 7, elevate the hearth sufficiently to provide a clear underlying space for the circulation, under the hearth, of the products of combustion from the furnaces 8, the flues 9 from which lead into said space. A flue 10 at the center, Fig. 2, leads from said space to a flue 11 and thence to a stack 12.

In the axis of the retort is a shaft 13, passing upwardly through a stuffing box 14 and is driven by gearing at 15.

The lower end of the shaft carries arms 16, to which are attached by means of the brackets 17, the rabbles 18. These rabbles are in the form of concave-convex disks, best arranged in gangs, each disk having its concave side facing outwardly. The disk gangs are mounted to rotate on their axes, and as they perform their revolution with the arms 16, their motion is partly roll and partly slip, over the surface of the hearth. This enables them to better dig through the mass of material on the hearth, and thus prevent the carbon resulting from the treatment, from adhering to the hearth. Also rabbles of this nature have the advantage, in connection with the sectional hearth, of passing over, without injury either to themselves or to the hearth, any inequality in the hearth surface, due to warping of the sections. At the ends of the rabble arms 16 are carried scrapers or "gophers" 19.

Near the periphery of the hearth at one point is a discharge pipe 20 which leads from the retort, down through the hearth and continues horizontally outwardly within the flue 21 of a fire box 22. In the discharge pipe 20 is a screw conveyer 23, driven by power applied to a sprocket 24. In the outer portion of the discharge pipe 20 is a fitting 25 having a Y branch 26, the lip of which, by the rotation of the fitting can be adjusted for the desired discharge.

Into the discharge pipe 20 is let a steam pipe connection 27 to admit steam from a suitable source. Around, spaced from and rising above the level of the hearth and base of the retort is a plate 28 which forms a chamber into which a ground inert material may be poured to effect a peripheral seal between the retort and hearth.

29 is a hopper which, through the pipe 30 and the conveyer 31 therein operated from sprocket 32 supplies the retort with the material to be treated. Vapor lines or offtakes 33, 34 and 35 lead off from the retort at different points, and a trough 36 on the inside of the retort leads the condensations on the retort wall into the offtakes 34 and 35. In Fig. 1, 37 is a pipe through which the terminals of a pyrometer may be let. 38 is a pipe which leads from the discharge pipe 20 to the exterior.

The operation of the apparatus is as follows:—

The sectional hearth 3 is heated by the furnaces 8, being hotter in its peripheral region than at its center. The material to be treated, say, for example, a mixture of a hydrocarbon containing material and a non-reactive material say, for example, ordinary clay shale or diatomaceous earth is supplied from hopper 29 to the retort 1 and falls upon the central region of the hearth 3. By the revolving rabbles 18 the material is well mixed and is carried outwardly over the hearth in a relatively thin sheet towards the periphery of the hearth, passing through zones or regions of increasing temperature. Destructive distillation of the hydrocarbon containing ingredient takes place and the volatile products together with any water present pass quietly off through the vapor offtakes 33, 34 and 35 and may be condensed in form suitable for transportation. As the non-volatile residue reaches the peripheral region of the hearth, where the distillation is complete, it has assumed a dry, friable non-caking consistency. Here this residue is discharged by the gophers 19 into the pipe 20 through which it is discharged by the conveyer 23 through the Y branch of the fitting 25 which thus effects a seal against the escape of gases from the retort other than through the proper vapor offtakes.

The solid or non-volatile residue discharged through pipe 20 may be collected and regenerated by burning out the entrained carbon. We provide for this in our apparatus by means which perform the additional function of converting the carbon into producer gas and making this gas serve a useful purpose in the general operation. As will be seen the solid residue passes out through pipe 20 and as this pipe is located on the flue 21 of the fire box 22 and as superheated steam is admitted to the discharge pipe through the connection 27 the carbon is converted into producer gas and this gas flowing counter current to the discharging regenerated residue, enters the retort through the pipe 20 and passes out through the vapor offtakes and may be collected in condensers and subsequently used in the furnaces. Or the producer gas thus formed may be led directly off to the condensers, through the pipe 38.

We claim:—

1. An apparatus for the described purpose comprising a retort to which the material to be treated is supplied; an underlying heating hearth upon which the base of the retort rests; a plate circumscribing and spaced from the joint between the retort and hearth to form a channel for the reception of material to seal said joint; a conduit leading from the peripheral region of the hearth for the discharge of the residual material; offtakes from the retort for the vaporus material; disk-rabble gangs within the retort, revolving over the hearth for mixing the material being treated and directing it outwardly; and scrapers associated with the rabble gangs at their outer extremities to deliver the residual material to the discharge conduit.

2. An apparatus for the described purpose comprising a retort to which the material to be treated is supplied; an underlying heating hearth upon which the base of the retort rests; a conduit leading from the peripheral region of the hearth for the discharge of the residual material; offtakes from the retort for the vaporous material; revolving disk-rabble gangs operating over the hearth for mixing the material being treated and directing it outwardly; scrapers associated with the rabble gangs at their outer extremities to deliver the residual material to the discharge conduit; and means for heating the hearth to a temperature increasing from the central region outwardly.

3. An apparatus for the described purpose comprising a retort to which the material to be treated is supplied; an underlying heating hearth; offtakes from the retort for the vaporous material; disk-rabble gangs operating over the hearth for mixing the material being treated and directing it outwardly; and a pipe leading from the peripheral region of the hearth for discharging the residual material, said pipe having a Y-branch rotatably fitted upon its outer end to form a trap against the escape of vapors.

4. An apparatus for the described purpose comprising a retort to which the material to be treated is supplied; an underlying heating hearth; offtakes from the retort for the vaporous material; disk-rabble gangs operating over the hearth for mixing the material being treated and directing it outwardly; a pipe leading from the peripheral region of the hearth for discharging the residual material, said pipe having a Y-branch rotatably fitted upon its outer end to form a trap against the escape of vapors; a fire box through which said discharge pipe passes;

and a steam connection from an extraneous source leading into said discharge pipe.

5. In an apparatus for the described purpose, a heating hearth composed of sections having legs to raise them and provide for circulation beneath a heating medium, said legs having feet in jointed relation between adjacent legs, and the tops of said sections interfitting with overlapping tongue and groove joints, with a clearance in the joints adapted to be filled by the material being treated upon the hearth.

In testimony whereof we have signed our names to this specification.

CLIFFORD P. BOWIE.
MARTIN J. GAVIN.